United States Patent
Carlson, Jr. et al.

(10) Patent No.: US 8,082,255 B1
(45) Date of Patent: Dec. 20, 2011

(54) BRANDING DIGITAL CONTENT

(75) Inventors: Edward J. Carlson, Jr., Durham, NC (US); Andrew Watts, Durham, NC (US); Steve Jernigan, Chapel Hill, NC (US); Robert Hubbard, Wake Forest, NC (US); Ferol Vernon, Durham, NC (US)

(73) Assignee: eMinor Incorporated, Durham, NC (US)

( * ) Notice: Subject to any disclaimer, the term of this patent is extended or adjusted under 35 U.S.C. 154(b) by 266 days.

(21) Appl. No.: 12/623,065

(22) Filed: Nov. 20, 2009

Related U.S. Application Data

(60) Provisional application No. 61/116,868, filed on Nov. 21, 2008.

(51) Int. Cl.
*G06F 17/30* (2006.01)

(52) U.S. Cl. ....... 707/737; 707/913; 707/966; 705/26.1; 705/26.5; 705/28

(58) Field of Classification Search .......... 707/609, 707/636, 637, 640, 648, 652, 705, 737, 770, 707/913, 966; 705/26.1, 26.5, 28; 709/206, 709/219, 227, 231, 232; 715/205, 210, 273, 715/749, 750; 380/201, 210
See application file for complete search history.

(56) References Cited

U.S. PATENT DOCUMENTS

| | | | |
|---|---|---|---|
| 6,338,044 B1 * | 1/2002 | Cook et al. | 705/14.54 |
| 7,188,342 B2 * | 3/2007 | DeMello et al. | 717/173 |
| 2001/0044779 A1 * | 11/2001 | Iima et al. | 705/52 |
| 2003/0028432 A1 * | 2/2003 | Troyansky et al. | 705/14 |
| 2003/0191816 A1 * | 10/2003 | Landress et al. | 709/219 |
| 2004/0268413 A1 * | 12/2004 | Reid et al. | 725/131 |
| 2009/0012873 A1 * | 1/2009 | Hamling et al. | 705/26 |
| 2009/0053992 A1 * | 2/2009 | Butler | 455/3.06 |

FOREIGN PATENT DOCUMENTS

WO WO2006000967 A1 * 1/2006

OTHER PUBLICATIONS

Faloutsos et al, Efficient and Effective Querying by Image Content, 1994 Kluwer Academic Publishers, pp. 231-262.*
Datta et al., Content-Based Image Retrieval—Approaches and Trends of the New Age, 2005 ACM, pp. 253-262.*
Kosch et al., Smooth—A Distributed Multimedia Database System, 2001 VLDB, pp. 1-2.*

(Continued)

*Primary Examiner* — Fred I Ehichioya
(74) *Attorney, Agent, or Firm* — Kevin E. Flynn; Flynn IP Law

(57) ABSTRACT

A process for creating a melded visual image to accompany a delivery of digital content. The melded image including at least a digital image associated with the digital content and a first placement image. The first placement image selected for delivery with the digital image in accordance with the execution of one or more rules concerning the digital content or the end user receiving the digital content. The melded image may contain constituent parts that have been altered such as changing the aspect ratio or transparency so that the digital image and the placement image can be displayed on a display screen associated with at least one class of player device that may play the digital content. The placement image may be part of an advertising campaign.

48 Claims, 3 Drawing Sheets

OTHER PUBLICATIONS www.archive.org entry printed Nov. 17, 2009 (9 pgs total) showing: a) search results for www.podingtonbear.com (1 pg); b) entry that purports to be Mar. 3, 2007 version of the www.podingtonbear.com website (2 pgs); and c) material purported to be a Feb. 23, 2007 posting on the www.podingtonbear.com website with title "Thoughts on Music" (6 pgs).

"Thoughts on Music—Podington Bear" material obtained from www.podingtonbear.com/thoughtsonmusic.htm on Nov. 17, 2009 and believed to be the unabridged material referenced in the Feb. 23, 2007 posting. May be from on or before Feb. 23, 2007 (5 pgs).

"Be My Patron." Obtained Nov. 17, 2009 from a link at the end of the "Thoughts on Music—Podington Bear" material described above (C-02). May be from on or before Feb. 23, 2007 (2 pgs).

\* cited by examiner

BRANDING DIGITAL CONTENT

BACKGROUND

This application claims benefit of and incorporates by references U.S. Provisional Application No. 61/116,868 filed Nov. 21, 2008.

FIELD OF THE INVENTION

This disclosure relates generally to advertising and to processes for distributing digital content including distributions over a network such as a site that provides music downloads.

Process of Music Downloads

One likely use of the present disclosure is in connection with music download web sites. Thus, it is useful to review the concept of music downloads. One way of acquiring music downloads is via a download button on the website that appears in proximity to the digital content, or via social network applications or widgets that contain the digital content. To acquire the digital content through this route the user must activate a download button. This may be described as a user-pull operation as the user pulls the specific download.

An alternative to a user-pull operation is a push operation where a user is designated to receive certain types of content (such as a selection of the week) based on particular criteria and then material is delivered to the end user.

The examples provided below to illustrate implementations of the teachings of the present invention focus on digital content for music, but nothing in this disclosure is necessarily limited to the use with music files as opposed to other digital content. Likewise, nothing should be interpreted as limiting this disclosure to audio files as opposed to audio/visual content (such as movies, television programs, or applications such as computer games), or pure visual content such as electronic books, electronic newspapers, or representations of works of art.

SUMMARY

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Process of Providing Melded Image with Delivery of Digital Content

Figure 1:
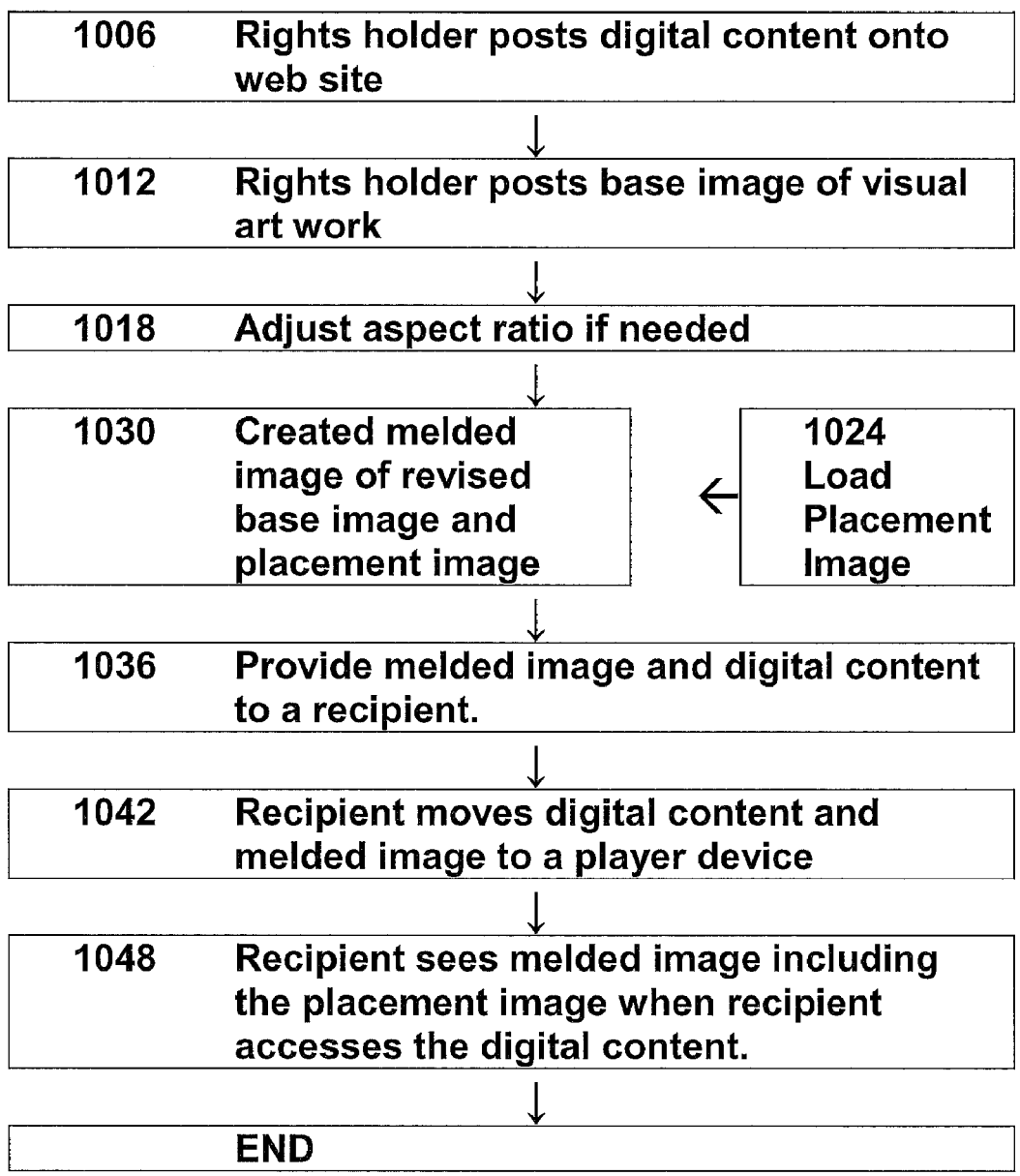
FIG. 1 is a flow chart with a high level representation of one implementation of the process for delivering melded visual content along with delivered digital content.
Figure 2:
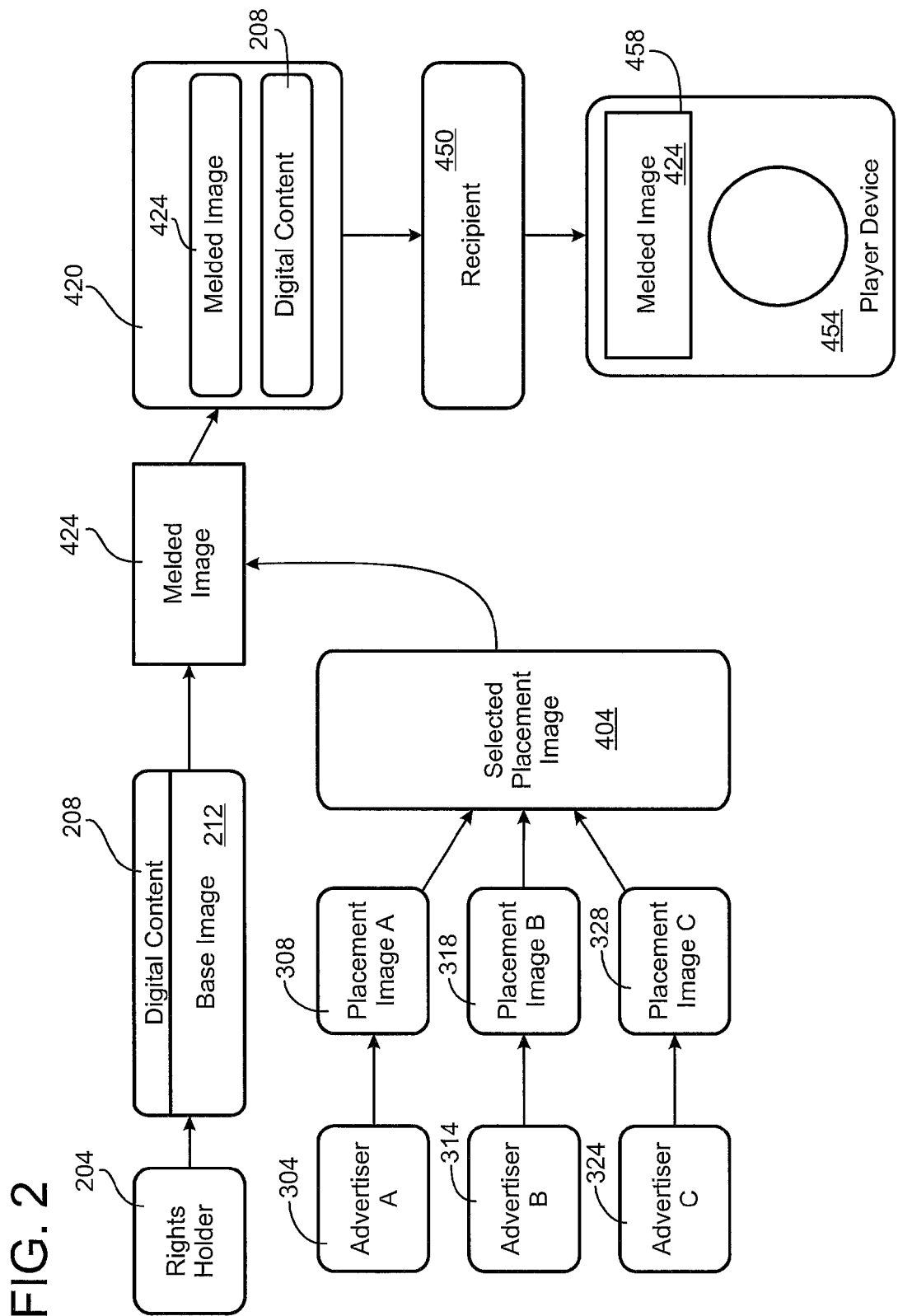
FIG. 2 is a graphic representation of one implementation of the process for delivering melded visual content along with delivered digital content.

FIG. 1 is a flow chart with a high level representation of one implementation of the process for delivering melded visual content along with delivered digital content. FIG. 2 is a graphic representation of one implementation of the process for delivering melded visual content along with delivered digital content.

Delivered digital content includes audio, visual, or audio-visual content such as music, books, or videos. It includes digital content of other sorts including games, software applications, or applets. The scope of the disclosed method is not to be limited by the type of digital content. The melded visual content could be provided within the delivered digital content as part of a single file. For example the melded image could be part of Meta data that is accessible by a device that uses the digital content. In other instances, the melded image may be in a separate file sent with a set of files provided as the digital content. As digital content is not closely linked to the confines of a single file, it is perhaps easier to reference the delivery and playing of digital content or a data set than to describe it as the delivery and playing of a "file".

STEP 1006—The rights holder 204 places the digital content 208 onto the web site. The process of creating and delivering a melded image does not rely on a particular process for providing the digital content 208 to the web site. The digital content could be uploaded to a web site or the digital content could be provided by physical media or provided to the web site by an application interface that does not use a web browser. While a web site is a useful example that helps convey the concept, the present disclosure could be used with some other repository of digital content that provides digital content to recipients. An on-demand delivery service for downloadable content via any type of communication form could implement teachings of the present disclosure.

The rights holder may be an individual that has recorded a song or produced a video, authored, or otherwise created the digital content. The rights holder may simply be the current "Rights Holder" of such content as the rights may have passed one or more times and ended up with the current rights holder. The rights holder may be a record label, Disney, a publisher or some other entity that owns the rights to the digital content.

The concept of required rights for various types of digital content varies: A) over time, B) across digital content classes, and C) across countries. In some instances, many or all people may have sufficient rights to make the digital content available through the web site. In those instances, people with sufficient rights to place the content on the web site are "rights holders" even if they do not have unique rights. This may be the situation where the digital content is in the public domain or in a system where peer to peer file sharing is accepted.

The digital content may include components that may be selected and delivered separately. For example, if the digital content is a music album, then it may be possible to obtain individual songs. Alternatively, it may be possible to obtain separate tracks, for example the vocals separately from the music or the lead guitar separately from the rest of the music. The variety of ways that the digital content may be subdivided and distributed are not at the core of this disclosure but the disclosure is intended to include any parsing of digital content into segments that may be delivered to a recipient. The format of the digital content is not central to this disclosure and will evolve over time as new formats for communicating digital content are developed. As an example for music, the music digital content may be in the form of an MP3. (MP3 is the file extension for a compressed audio file according to the conventions of MPEG Audio Layer-3 format)

STEP 1012—The rights holder places visual art work onto the web site to be associated with this digital content as base art work which can be called the base image 212. While it is possible that a rights holder may place a separate image for each sub-component of the digital content (such as a separate image for each song), it is more likely that the rights holder will have one image as base art work for the entire album. In some instances, the rights holder may not have album art work for this particular digital content and may simply use a general image of the artist that performed the digital content. Thus, the base image 212 may be provided to the site before, with, or after delivery of the digital content 208. There may be a number of different items of digital content 208 that become associated with the same base image 212.

STEP 1018—Depending on the scheme used for creating the melded image 424, it may be necessary to alter the aspect ratio of the base image 212 to allow room in the melded image 424 for a placement image (308, 318, or 328) provided by an advertiser (304, 314, or 324).

Figure 3:
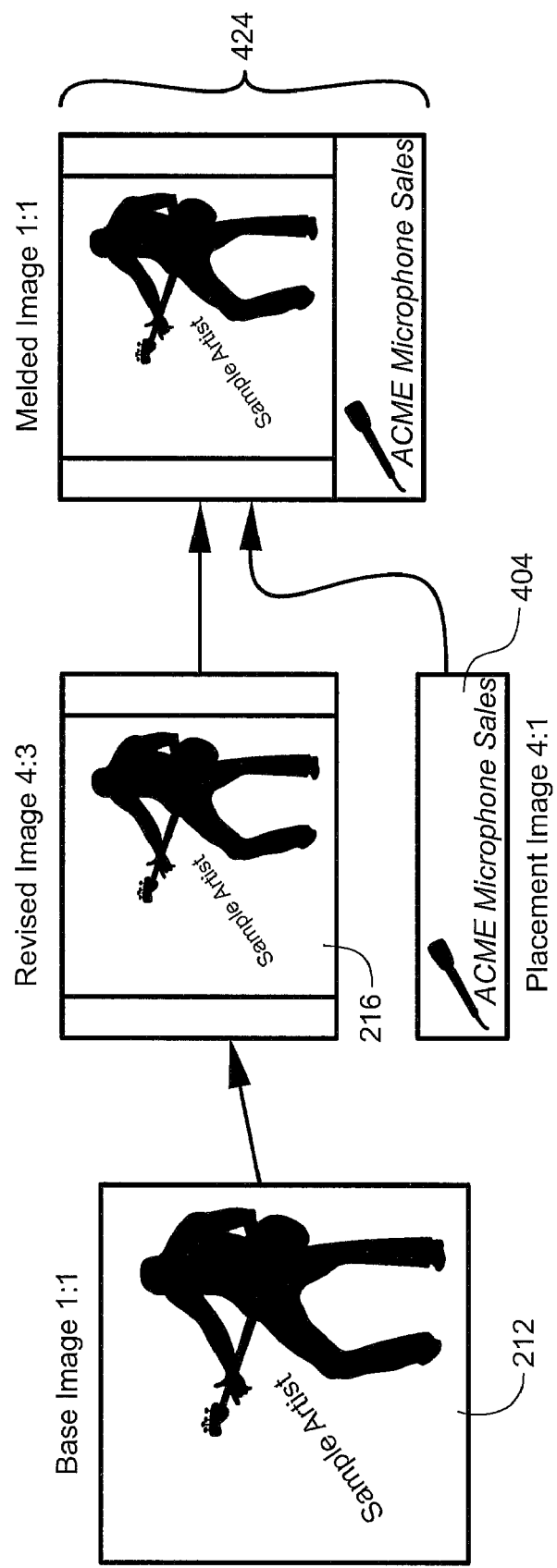
FIG. 3 is a representation of one implementation of a process to create a melded image with a placement image.

For example, as shown in FIG. 3, if the base image 212 has a 1 to 1 aspect ratio and the space allocated in the melded image 424 calls for the selected placement image 404 to have the bottom 25% of a 1 to 1 aspect ratio image, then the base image needs to be modified to a revised image 216 with a 4 to 3 aspect ratio. The combination of a 4 to 3 revised image 216 and a 4 to 1 selected placement image 404 produces the 1 to 1 melded image 424. The revised image may be created through stretching or compressing the base image, cropping a portion of the base image, or a combination of both.

In the event that the base image 212 is in the desired aspect ratio for creating the melded image 424, then the revision process does not do anything and the revised image 216 is the same as the base image 212. A variation of this concept is for the rights holder to provide a set of base images with different aspect ratios, (perhaps through selective cropping of the image) so that either no additional change is needed to adjust the aspect ratio or the changes made by stretching/compression are less dramatic as a base image close to the desired aspect ratio was selected as the most appropriate base image.

Step 1024—Load placement image. The placement image (308, 318, or 328) is what an advertiser (304, 314, or 324) wants to put before the digital content recipient 450. The placement image (308, 318, or 328) becomes part of the melded image 424. A digital content site is apt to receive digital content 208 with associated base images 212 on an ongoing basis. Likewise the digital content site is apt to receive placement images (308, 318, or 324) on an ongoing basis. The order of when a particular base image arrives and a particular placement image arrives is not critical as long as a base image is present so that a revised image may be created and combined with a selected placement image 404 to form a melded image 424.

Step 1030—Combine the selected placement image 404 with the revised image 216 to form the melded image 424 as shown in FIGS. 2 and 3.

Step 1036—Provide the melded image 424 and digital content 208 to a recipient 450. The recipient 450 may receive the digital content 208 and melded image 424 via a download, via streaming, via receipt of digital media, or via an analogous process. The recipient may be designated to receive a particular piece of digital content in a number of ways such as A) using various menu or search tools, B) downloading this digital content as part of a set of related digital content (such as all the songs on an album), or C) signing up for a subscription that causes certain types of digital content to be delivered in the future. How the recipient selects the digital content is not part of the focus of the present disclosure.

Typically, the movement of the digital content 208 to the recipient 450 would be over a communications network such as the Internet or a telephone network, but it could be through other communication networks or through the delivery of physical media such as a disc with a set of digital content on the physical media.

Step 1042—Recipient 450 moves digital content 208 and melded image 424 to a player device 454. In some instances the act of providing the digital content to the recipient is the same as the act of moving the digital content to the player device as the digital content is delivered directly to the player device (such as an IPOD® brand electronic player device or a cellular telephone adapted to receive and use digital content). In other instances, the digital content would be received by an intermediate device such as a laptop computer and communicated to a player device. In yet another instance, the player device may be the laptop computer. The communication to the player device may involve wired communication, wireless, communication, or the movement of physical media containing the digital content 208 and the melded image 424.

Step 1048—Recipient 450 uses the player device 454 to play the digital content 208 and a display screen 458 associated with the player device 454 displays the melded image 424 including the selected placement image 404. For digital content 208 that is exclusively audio content, the melded image 424 may be displayed during the entire time the digital content is played. For digital content 208 that is a mix of audio and visual content or just visual content, the melded image 424 may be displayed only when seeking a title to play (like a box for a rental movie), immediately before the digital content 208 is played, or during pauses of the digital content 208. These examples are provided to show the variety of options for when the melded content 424 is displayed. One of skill in the art will recognize that the actual display of the melded content 424 being driven by the way that the player device 454 handles a representative graphic image for particular digital content. The player device 454 that displays visual content as part of the digital content 208 may have a separate visual screen for this use, may use a portion of the screen that displays the visual content that is used for the melded image, or may display the visual content for selected times before or after the display of the visual content.

Note that if the recipient 450 makes a copy of the digital content 208 and distributes that copy to either a second player device belonging to the recipient 450 or to a third party, the melded image 424 may be passed with the digital content 208. Thus there may be secondary distribution of the selected placement image 404 within the melded image 424 even if the digital content 208 is redistributed contrary to rights held or reserved by the rights holder 204.

Selection of Placement Image

1) Placement Based On Digital Content & Placement Price

The selection of the placement image may be done at least in part based upon a request from an advertiser to place a placement image into the melded image for a particular piece of digital content. The advertiser ABC might authorize distribution of 10,000 placement images with delivery of digital content "A" for a placement price of 5 money units per delivery. Advertiser DEF may authorize distribution of 1,000 placement images of the same digital content "A" for a placement price of 8 money units per delivery. Assuming that both of these advertisers placed these authorizations before the digital content was available for delivery and no other advertiser makes an authorization for payment:

the first 1,000 requests for delivery would contain a melded image with the placement image from advertiser DEF;

the next 10,000 deliveries of this digital content would have the melded image containing the placement image from advertiser ABC; and after 11,000 deliveries, the digital content may be provided with the base image rather than the melded image or the digital content may optionally be provided with a melded image that includes a placement image from the digital content site to advertise itself.

The concept of offering a placement price for a particular piece of digital content could be extended to all digital content from a given album or from a particular artist or group. The concept could be further extended to all digital content within a particular micro-genre such as Celtic instrumental music or a particular style of rap music but only if performed by a female artist.

2) Placement Based Upon Demographics

An implementation may be created that selects the placement image based upon the demographics of the digital content recipient. The demographics may be based upon a combination of sources. The sources may include:

information that the digital content recipient provided to the site when registering with the site;

information about the digital content recipient obtained from other information repositories; and information obtained about the digital content recipient through interactions with a network such as:

the site from which the digital content recipient entered the present site, the server location for the digital content recipient, the frequency of downloads by this digital content recipient; and the types of digital content sought by this digital content recipient including a categorization of the digital content for this content request.

Thus a given digital content recipient, Pat, may have a series of demographic attributes associated with Pat. For sake of this example, assume that Pat has 26 attributes which we will call A, B, C, . . . X, Y, Z. If advertiser BM1 offers a placement price of 5 money units per placement for 1,000 placements for digital content recipients with demographic qualities A, B, C, and D, then Pat would be a qualified digital content recipient for this placement. However, if some other advertiser BM2 has authorized a placement price of 7.5 money units for 2,000 placements to digital content recipient with demographic qualities A, E, I, O, U, and Y, the system would insert the placement for BM2 into Pat's digital content's melded image if the 2,000 placement authorization had not been exhausted.

The demographic based system works particularly well for sites with many instances of digital content that may not be familiar to particular advertisers. This allows the advertisers to place their images onto melded images for digital content deliveries for the artists that are rising from obscurity to popularity before the popularity has reached the point where the advertisers are vying to offer placement prices for that particular artist.

An example of a set of demographics for selecting a digital content recipient is an advertiser seeking to reach a music fan that lives in the United States, is 17 to 24 years old, is seeking to download digital content from "rock" genre and is a female.

3) Placement Based Upon a Blended Model

In a blended model, when digital content recipient Pat seeks to download digital content A, then the highest available placement price is selected based upon either the demographics or the digital content specific placements. In this example, the highest price for placement for this download is from Advertiser ABC as 8 money units for delivery of a placement image with delivery of digital content A is more than 7.5 money units offered by BM2 for a delivery of the placement image to someone with demographic qualities A, E, I, O, U, and Y.

Reports to Advertisers

Advertisers may receive reports that indicate how many placements were made in a given time period and information about the individual placements such as:

digital content;

demographic profile factors of interest to the advertiser; and date and time of the download.

Alternative Implementations

The examples given above are intended to provide insight on how the present disclosure may be used. The examples are not exhaustive and are not intended to recite every possible use of the present disclosure. Certain variations of the implementation options are discussed below.

Location of the Placement Image

In order to provide a concrete example for a drawing, FIG. 3 shows the selected placement image 404 being placed adjacent and below the revised image 216. The teachings of the present disclosure apply equally to placement images placed above or to either side of the revised image 216.

Overlap of Placement Image onto the Revised Image

The example uses a revised image 216 and a selected placement image 404 that are placed adjacent to one another and do not overlap one another. This is not necessary for the practice of the present invention. Thus the selected placement image 404 may be placed over the revised image 216 to partially cover some of the revised image 216. The selected placement image 404 placed over the revised image may have some level of transparency so that the colors of the revised image 216 are visible through the revised image but certain text or graphics of the placement image are opaque or less transparent than other portions of the selected placement image.

Aspect Ratio of the Melded Image

While a 1 to 1 aspect ratio for the melded image may be particularly convenient for use by a wide range of player devices, the present disclosure does not require any particular aspect ratio for the melded image. Consequently, the present disclosure does not require specific aspect ratios for the revised image or the placement image.

Variable Aspect Ratio for Revised Images, Placement Images, or Melded Images

While for the sake of simplicity, it may be desirable to have the same process for creating all melded images, this is not required. Thus not all revised images 216 need to have a particular aspect ratio and not all selected placement images 404 of another particular aspect ratio in order to combine the two images to form every time a melded image 424 of a particular aspect ratio. For example, the aspect ratio for the revised image for a particular base image does not have to be constant, as it may be 4 to 3, or slightly different aspect ratios such as 5 to 4 or 3 to 2. Having the ability to make revised images of different aspect ratios allows the different revised images to be used with placement images of different aspect ratios so that the melded image has a particular desired aspect ratio.

Likewise if the desired aspect ratio for the melded image varies from situation to situation, the aspect ratio of the revised image and possibly of the placement image may be modified to achieve that desired aspect ratio for the melded image used in that specific instance of a delivery of that digital content.

A variation in the optimal aspect ratio may arise from providing digital content to be used with different player devices with different aspect ratios in their displays.

Relationship between Advertiser and Placement Image

For the sake of simplicity, FIG. 2 has a set of three advertisers each providing one placement image. It is likely that some, perhaps most advertisers, will have a number of different placement images on the site at any given time. Sometimes the placement images will be targeted towards different end users and thus have different rules for selecting which digital content deliveries are eligible to receive a particular placement image. Sometimes a particular campaign may have several placement images that are used for the same group of end users and the web site will rotate through the set. Within the scope of the teachings contained herein, the placement image provided with the digital content may actually be a series of several placement images that are all delivered with a single delivery of digital content but are displayed at different times in different versions of the melded image when the end user is interacting with the digital content via the player device. Thus, the melded image may not be a static image but is digital information sufficient for the player device to create the melded image.

Download

As an example of the use of the present disclosure was for music downloads, the term download is used repeatedly in this disclosure. The way the digital content is delivered is not central to the use of the disclosed concepts. The delivery of digital content could be triggered by an end-user pull—a request from the end user to deliver specific digital content, or a content push where digital content is pushed to various end users in accordance with a previously determined rule.

The digital content could be delivered by any type of carrier media including systems currently associated with the Internet network, telephone networks, and broadcast networks such as radio or television. In some contexts, the type of delivery may be described as streaming rather than a download. The present disclosure could be extended to digital content that is provided via tangible media such as a disc (including Compact Disc, DVD, or other type of disc) or a portable drive such as a flash drive or SD card.

Device

The device that receives the digital content could be a portable personal media player such as an IPOD® brand electronic player device, MP3 player, or other device. The device that receives the digital content could be a laptop or other computer including one adapted to be a media server. The device that receives the digital content could be a device that communicates with a network to send and receive data such as a telephone device, Blackberry® device, or analogous device. The player device could be a device that specializes in the receipt and display of electronic books.

The device that receives digital content could be a device that receives broadcast content such as a radio in a home or automobile (including one adapted to receive XM radio or analogous transmissions), or a television device.

The device may receive the digital content through a communication port. The communication port may be adapted for use with a wired communication protocol. The communication port may include components such as an antenna to allow the receipt of wireless communications and may allow the transmission from the device of wireless communication.

The device that receives digital content could be one that is not normally connected to a communication network for receiving broadcast information but can play digital media such as a camera, video camera, digital picture frame, video player, game station device, or other analogous device.

Interactive Content

If the digital content is intended for use with an external network such as the Internet or a telephone network, the placement image and thus the melded image may include interactive content. One example is clickable content that provides an instruction to the device currently holding the melded image to link the recipient to a particular location on that network. For example, the clickable content may cause the player device to display a web page from a particular address. The clickable content may cause identifying information about the recipient or the device to be registered such as registration to a newsletter or a fan club. The range of activities that could be enabled by the passing of clickable content in the placement image portion of the melded image is not limited by these few examples.

The interactive content does not need to respond to a "click." The interactive content could respond to any type of user input. Examples of user input include actions such as:
 tapping a touch screen,
 hovering an x-y input cursor over a portion of the placement image, and even
 inaction as in some cases the failure of a user to proceed with making a selection may result in a time-out that automatically provides the user with an option to make a different selection or routes the user to an address where the user may receive additional help.

Distribution of Software

It is also important to note that although the present disclosure has been described in the context of a fully functional computer system, those skilled in the art will appreciate that the mechanisms of the present disclosure are capable of being distributed as a program product or a portion of a suite of programs. This distribution may be done in a variety of forms. The inventiveness of the present disclosure is present in a set of computer instructions adapted to implement some or all of the innovations described above regardless of how this set of instructions is conveyed. A set of computer instructions is a set of instructions adapted for use by a computer in achieving some or all of the advantages set forth above and is distinguishable from a paper such as this disclosure that describes the attributes of an implementation without providing anything that can be processed by computer components available in 2008 to ultimately be executed by a computer.

One of skill in the art will recognize that the set of computer instructions may be stored on one or more mass storage memory devices that are accessible by a particular computer system to implement some or all of the innovations described above. The set of computer instructions may be conveyed in one of many types of signal bearing media. Signal bearing media carrying instructions to be executed by one or more computer programming languages may be conveyed in different formats including, without limitation, program instructions in high level programming languages or in machine code.

The signal bearing media may be located on traditional articles of manufacture that are any one of a variety of recordable type media such as floppy disks or compact discs (including write once and re-recordable media). In this instance the recordable type media receives a written set of computer instructions which can subsequently be read by an input device. The recordable type media may then be shipped from one place to another such as shipped to a customer and then the customer may access the computer instructions written into the recordable type media.

A separate category of signal bearing media not currently considered a traditional article of manufacture under the United States patent laws is a paper printout carrying the sequence of computer instructions in at least one computer software language. One of skill in the art will recognize that an appropriate scanner may read paper through such routes as bar code readers, optical character recognition (OCR) of text, or via detection of holes in paper cards or paper tape.

The signal bearing media may be any of the many transmission type media such as analog or digital communication links as the software may be conveyed to a purchaser without the shipment of permanent tangible media but through a transitory propagating signal such as a series of Internet protocol packets.

To the extent that the relevant patent laws allow issuance of claims covering each of these three types of signal bearing media, (recordable media, paper printout, and transmission type media), then it is the intent to include such signal bearing media within the scope of relevant claims.

GENERAL COMMENTS

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure.

What is claimed is:

1. A process for creating a melded visual image to accompany a delivery of digital content, the process comprising:
storing a first collection of digital content in a first memory device accessible to a first computer system;
storing a first image data set containing at least a first digital image associated with the first collection of digital content in a second memory device accessible to the first computer system;
storing a second collection of digital content in a third memory device accessible to the first computer system;
storing a second image data set containing at least a second digital image associated with the second collection of digital content in a fourth memory device accessible to the first computer system;
storing a first digital representation of a first placement image associated with a first rule for selecting digital content deliveries as eligible to include the first placement image;
recognizing that a planned delivery of the first collection of digital content is eligible under the first rule to include the first placement image;
delivering to a first communication network, the first collection of digital content with a first melded data set containing a digital representation of a first melded visual image comprising a combination of the first digital image and the first placement image, the first melded data set delivered in a first format which allows at least one class of player devices capable of using the first collection of digital content to display the first melded visual image in association with the first collection of digital content;
recognizing that a planned delivery of the second collection of digital content is eligible under the first rule to include the first placement image; and
delivering to a second communication network, the second collection of digital content with a second melded data set containing a digital representation of a second melded visual image comprising a combination of the second digital image and the first placement image, the second melded data set delivered in a second format that may be the same as the first format and which allows at least one class of player devices capable of using the second collection of digital content to display the second melded visual image in association with the second collection of digital content.

2. The process of claim 1 wherein the first melded visual image contains a representation of the first digital image adjacent to a representation of the first placement image.

3. The process of claim 2 wherein a digital representation of the first digital image within the first melded image does not contain all of the first digital image.

4. The process of claim 1 wherein the representation of the first digital image within the first melded image use an aspect ratio that is different from the first digital image.

5. The process of claim 1 wherein the first melded visual image contains a representation of the first digital image under a representation of the first placement image.

6. The process of claim 5 wherein the first placement image is at least partially transparent so that the first digital image is visible through the first placement image.

7. The process of claim 1 wherein a representation of the first placement image within the first melded visual image has an aspect ratio that is different from the first placement image.

8. The process of claim 1 further comprising delivering the first cluster of digital content a second time with a representation for the first digital image but without the first placement image.

9. The process of claim 1 wherein output from a player device of the first cluster of digital content includes audio output.

10. The process of claim 1 wherein output from a player device of the first cluster of digital content includes a display of visual content.

11. The process of claim 10 wherein the output from a player device of the first cluster of digital content includes both audio output and the display of visual content.

12. The process of claim 1 wherein a microprocessor-based computer adjusts an aspect ratio of the first digital image for use in the first melded visual image.

13. The process of claim 1 wherein the planned delivery of the first collection of digital content is triggered by an end user communicating across a communication network requesting delivery of the first collection of digital content.

14. The process of claim 13 wherein the first rule is triggered at least in part by an attribute of the first collection of digital content.

15. The process of claim 13 wherein the first rule is triggered at least in part by an attribute of the end user.

16. The process of claim 1 wherein the first melded data set includes interactive content associated with a portion of the first melded visual image so that an input device associated with the at least one class of player devices may trigger an action via the interactive content.

17. The process of claim 1 wherein at least two of the first memory device, second memory device, third memory device, and fourth memory device are implemented in a common memory device.

18. The process of claim 1 wherein the first communication network is also the second communication network.

19. A process for creating a melded visual image to accompany a delivery of digital content, the process comprising:
storing a first collection of digital content in a first memory device accessible to a first computer system;
storing a first image data set containing at least a first digital image associated with the first collection of digital content in a second memory device accessible to the first computer system;
storing a first digital representation of a first placement image associated with a first rule for selecting digital content deliveries as eligible to include the first placement image;
recognizing that a first planned delivery of the first collection of digital content is eligible under the first rule to include the first placement image;
delivering to a first communication network, the first collection of digital content with a first melded data set containing a digital representation of a first melded visual image comprising a combination of the first digital image and the first placement image, the first melded data set delivered in a first format which allows at least one class of player devices capable of using the first collection of digital content to display the first melded visual image in association with the first collection of digital content;
storing a second digital representation of a second placement image associated with a second rule for selecting digital content deliveries as eligible to include the second placement image;
recognizing that a second planned delivery of the first collection of digital content is eligible under the second rule to include the second placement image; and
delivering to a second communication network, the first collection of digital content with a second melded data set containing a digital representation of a second melded visual image comprising a combination of the first digital image and the second placement image, the second melded data set delivered in a second format that may be the same as the first format and which allows at least one class of player devices capable of using the first collection of digital content to display the second melded visual image in association with the first collection of digital content.

20. The process of claim 19 wherein the first melded visual image contains a representation of the first digital image adjacent to a representation of the first placement image.

21. The process of claim 20 wherein a digital representation of the first digital image within the first melded image does not contain all of the first digital image.

22. The process of claim 19 wherein a digital representation of the first digital image within the first melded visual image uses an aspect ratio that is different from the first digital image.

23. The process of claim 19 wherein the first melded visual image contains a representation of the first digital image under a representation of the first placement image.

24. The process of claim 23 wherein the first placement image is at least partially transparent so that the first digital image is visible through the first placement image.

25. The process of claim 19 wherein a representation of the first placement image within the first melded visual image has an aspect ratio that is different from the first placement image.

26. The process of claim 19 further comprising delivering the first collection of digital content a second time with a representation of the first digital image but without the first placement image.

27. The process of claim 19 wherein output from a player device of the first cluster of digital content includes audio output.

28. The process of claim 19 wherein output from a player device of the first cluster of digital content includes a display of visual content.

29. The process of claim 28 wherein the output from a player device of the first cluster of digital content includes both audio output and the display of visual content.

30. The process of claim 19 wherein a microprocessor-based computer adjusts an aspect ratio of the first digital image for use in the first melded visual image.

31. The process of claim 19 wherein the first planned delivery is triggered by an end user communicating across a communication network requesting delivery of the first collection of digital content.

32. The process of claim 31 wherein the first rule is triggered at least in part by an attribute of the first collection of digital content.

33. The process of claim 31 wherein the first rule is triggered at least in part by an attribute of the end user.

34. The process of claim 19 wherein the first melded data set includes interactive content associated with a portion of the first melded visual image so that an input device associated with the at least one class of player devices may trigger an action via the interactive content.

35. The process of claim 19 further comprising:
storing a second collection of digital content in a third memory device accessible to the first computer system;
storing a second image data set containing at least a second digital image associated with the second collection of digital content in a fourth memory device accessible to the first computer system;
recognizing that a third planned delivery of the second collection of digital content is eligible under the first rule to include the first placement image; and
delivering to a third communication network, the second collection of digital content with a third melded data set containing a digital representation of a third melded visual image comprising a combination of the second digital image and the first placement image, the third melded data set delivered in a third format that may be the same as the first format and which allows at least one class of player devices capable of using the second collection of digital content to display the third melded visual image in association with the second collection of digital content.

36. The process of claim 35 wherein at least two of the first memory device, second memory device, third memory device, and fourth memory device are implemented in a common memory device.

37. The process of claim 35 wherein at least two of the first communication network, the second communication network, and the third communication network are implemented on a common communication network.

38. A player device for playing a selected cluster of digital content from a set of at least two clusters of digital content, the player device comprising:
- at least one memory for storing digital information;
- at least one display used at least in part to display visual content associated with but separate from the selected cluster of digital content;
- at least one component for receiving a cluster of digital content and visual content associated but separate from the cluster of digital content;
- a first cluster of digital content with a first melded visual image associated but separate from the first cluster of digital content wherein the first melded visual image comprises a representation of a first visual image associated with the first cluster of digital content melded with a first placement image provided by a third party unconnected to creation or distribution of the first cluster of digital content; and
- a second cluster of digital content with second visual content associated but separate from the second cluster of digital content wherein the second melded visual image comprises a representation of a second visual image associated with the second cluster of digital content melded with the first placement image provided by the third party unconnected to creation or distribution of the second cluster of digital content such that the player device contains at least the first visual content and the second visual content each containing a representation of the first placement image provided by the third party.

39. The player device of claim 38 wherein the first melded visual image is displayed by the player device to simultaneously display a representation of the first visual image associated with the first cluster of digital content melded with the first placement image provided by the third party unconnected to the creation or distribution of the first cluster of digital content.

40. A process for altering a visual image displayed by a digital player device, the process comprising:
- storing a first collection of digital content in a first memory device accessible to a first computer system;
- storing a first image data set containing at least a first digital image associated with the first collection of digital content in a second memory device accessible to the first computer system;
- storing a second collection of digital content in a third memory device accessible to the first computer system;
- storing a second image data set containing at least a second digital image associated with the second collection of digital content in a fourth memory device accessible to the first computer system;
- storing a first digital representation of a first placement image associated with a first rule for selecting digital content deliveries as eligible to include the first placement image;
- recognizing that a first planned delivery of the first collection of digital content is eligible under the first rule to include the first placement image; and
- delivering to a first communication network, the first collection of digital content with a first melded data set containing a digital representation of a first melded visual image comprising a combination of the first digital image and the first placement image, the first melded data set delivered in a first format which allows at least one class of player devices capable of using the first collection of digital content to display the first melded visual image in association with the first collection of digital content;
- recognizing that a second planned delivery of the second collection of digital content is eligible under the first rule to include the first placement image; and
- delivering to a second communication network, the second collection of digital content with a second melded data set containing a digital representation of a second melded visual image comprising a combination of the second digital image and the first placement image, the second melded data set delivered in a second format that may be the same as the first format and which allows at least one class of player devices capable of using the second collection of digital content to display the second melded visual image in association with the second collection of digital content.

41. The process of claim 40 further comprising:
- loading onto a player device the first collection of digital content with the first melded data set containing the first digital representation of the first melded visual image comprising the combination of the first digital image and the first placement image; and
- interacting with the player device to select the first collection of digital content and thus cause display of the first melded visual image.

42. The process of claim 40 wherein at least two of the first memory device, second memory device, third memory device, and fourth memory device are implemented in a common memory device.

43. The process of claim 40 wherein the first communication network is also the second communication network.

44. A process for altering a visual image displayed by a digital player device, the process comprising:
- storing a first collection of digital content in a first memory device accessible to a first computer system;
- storing a first image data set containing at least a first digital image associated with the first collection of digital content in a second memory device accessible to the first computer system;
- storing a first digital representation of a first placement image associated with a first rule for selecting digital content deliveries as eligible to include the first placement image;
- recognizing that a first planned delivery of the first collection of digital content is eligible under the first rule to include the first placement image;
- delivering to a first communication network, the first collection of digital content with a first melded data set containing a digital representation of a first melded visual image comprising a combination of the first digital image and the first placement image, the first melded data set delivered in a first format which allows at least one class of player devices capable of using the first collection of digital content to display the first melded visual image in association with the first collection of digital content;
- storing a second digital representation of a second placement image associated with a second rule for selecting digital content deliveries as eligible to include the second placement image;

recognizing that a second planned delivery of the first collection of digital content is eligible under the second rule to include the second placement image; and delivering to a second communication network, the first collection of digital content with a second melded data set containing a digital representation of a second melded visual image comprising a combination of the first digital image and the second placement image, the second melded data set delivered in a second format that may be the same as the first format and which allows at least one class of player devices capable of using the first collection of digital content to display the second melded visual image in association with the first collection of digital content.

45. The process of claim 44 further comprising:

storing a second collection of digital content in a third memory device accessible to the first computer system;

storing a second image data set containing at least a second digital image associated with the second collection of digital content in a fourth memory device accessible to the first computer system;

recognizing that a third planned delivery of the second collection of digital content is eligible under the first rule to include the first placement image; and delivering to a third communication network, the second collection of digital content with a third melded data set containing a digital representation of a third melded visual image comprising a combination of the second digital image and the first placement image, the third melded data set delivered in a third format that may be the same as the first format which allows at least one class of player devices capable of using the second collection of digital content to display the third melded visual image in association with the second collection of digital content.

46. The process of claim 45 wherein at least two of the first memory device, second memory device, third memory device, and fourth memory device are implemented in a common memory device.

47. The process of claim 45 wherein at least two of the first communication network, the second communication network, and the third communication network are implemented on a common communication network.

48. The process of claim 44 further comprising:

loading onto a player device the first collection of digital content with the first melded data set containing the digital representation of the first melded visual image comprising the combination of the first digital image and the first placement image; and interacting with the player device to select the first collection of digital content and thus cause display of the first melded visual image.

* * * * *